July 14, 1970 C. H. ATHERHOLT 3,520,293
ANTHROPOMETRIC APPARATUS
Filed April 12, 1967 2 Sheets-Sheet 1
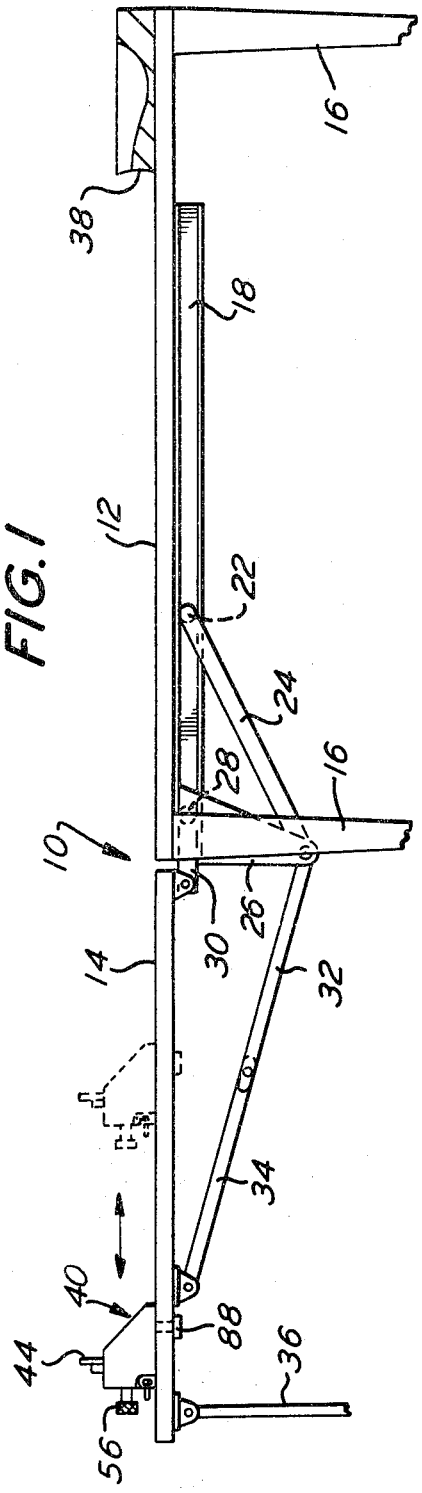
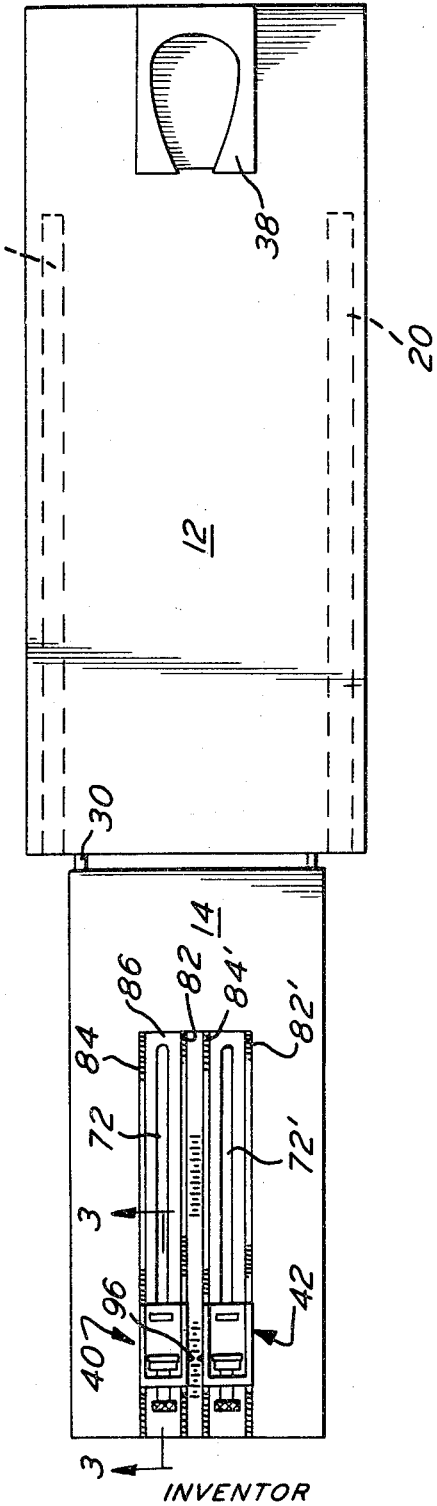
INVENTOR
CHARLES H. ATHERHOLT
BY
ATTORNEYS.

July 14, 1970     C. H. ATHERHOLT     3,520,293
ANTHROPOMETRIC APPARATUS
Filed April 12, 1967                                    2 Sheets-Sheet 2
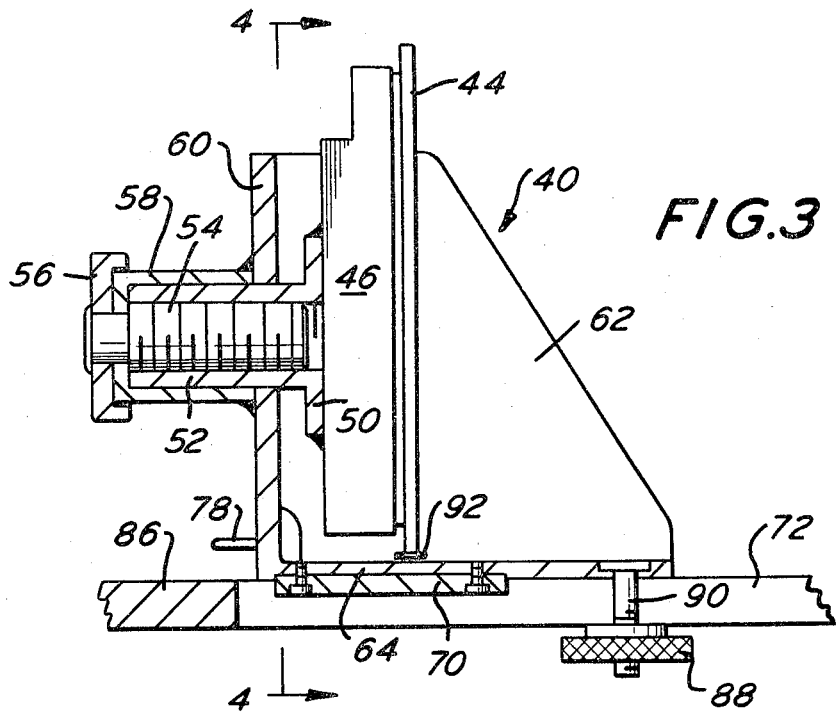
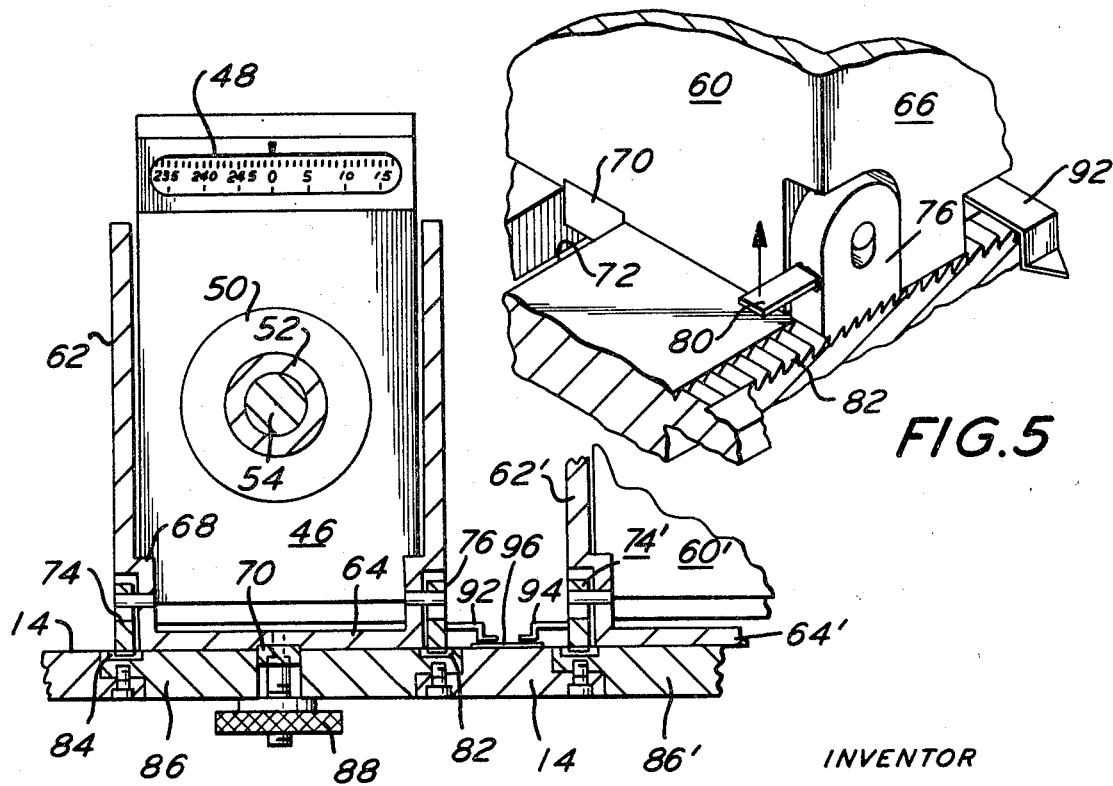
INVENTOR
CHARLES H. ATHERHOLT
BY
ATTORNEYS.

United States Patent Office 3,520,293
Patented July 14, 1970

3,520,293
ANTHROPOMETRIC APPARATUS
Charles H. Atherholt, 1003 Lee Drive,
Broomall, Pa. 19008
Filed Apr. 12, 1967, Ser. No. 630,277
Int. Cl. A61b 5/10
U.S. Cl. 128—2    10 Claims

ABSTRACT OF THE DISCLOSURE

An anthropometric apparatus, particularly for accurately measuring the length of the legs of a person or for detecting legs of unequal length. The apparatus includes first and second independently movable foot engaging members for applying force approximately one-half the weight of the person to each foot so that the leg measurements are made under conditions approximating those which exist when the person is standing. A scale on each member is provided with appropriate indicia for indicating the force applied to each foot. Additional indicia are provided for indicating the length of each leg.

---

This invention relates to anthropometric apparatus, and more particularly to apparatus for measuring the length of the legs of a person under conditions closely approximately those existing while the person is standing on his feet.

It is well-known that faulty body mechanics such as unequal leg lengths can result in painful and often debilitating conditions, such as the so-called "low back pain syndrome." Furthermore, unequal leg lengths, and the abnormal stress resulting therefrom on the skeletal and muscular support systems of the lower limbs and trunk, can lead to irreversible degenerative changes.

Measurement of the leg length is a routine diagnostic procedure. Such measurements are ordinarily made by placing the subject in supine position, and measuring with a tape measure, yard stick or the like from the hip bone to the heel for each leg. Such measurements are obviously subject to random observational error.

An apparatus has been proposed wherein an examination table is provided with adjustable foot-engaging members, which cooperate with calibrations on the table to give length readings for each leg. Such apparatus is far more effective than cruder methods of measurement, but, like the cruder methods, wholly overlooks the effect of body weight on the length of the limb. Thus, measurement of leg length in other than the functional, load bearing state is at best an approximation, and can result in failure to detect clinically significant asymmetry of the legs.

The present invention is an improved apparatus for measuring leg lengths wherein measurements are made while each leg of the subject has a compressive force approximating one-half the weight of the subject applied to it.

Accordingly, it is an object of this invention to provide an improved anthropometric apparatus, particularly for accurately measuring leg lengths.

It is another object of the invention to provide novel leg measuring apparatus on one section of a table with said section capable of being pivoted to an inoperative position.

It is another object of this invention to provide an apparatus for measuring leg lengths wherein a functional condition of the legs is approximated during measurement.

It is a still further object of this invention to provide a leg length measuring apparatus wherein an operator can obtain a simultaneous readout of the force applied to each leg and the difference in the lengths of the legs.

Other objects will appear hereinafter.

The objects of the invention are accomplished by an apparatus coupled to a horizontally disposed body support surface, the apparatus comprising a support member coupled to the body support surface, a foot engaging member movable relative to the support member, force for applying force to the foot engaging member, force measuring means for measuring the force on the foot engaging member, and a position indicator coupled to the foot engaging member for indicating the length of the limb.

For the purpose of illustrating the invention, there is shown in the drawings a form which is presently preferred; it being understood, however, that this invention is not limited to the precise arrangements and instrumentalities shown.

FIG. 1 is a partial side elevation view showing an examination table incorporating the apparatus of the present invention.

FIG. 2 is a top plan view of the table shown in FIG. 1.

FIG. 3 is a partial cut-away side elevation view taken along the line 3—3 in FIG. 2.

FIG. 4 is a partial end elevation view, taken along the line 4—4 in FIG. 3.

FIG. 5 is a partial perspective view showing a detail of apparatus in accordance with the present invention.

Referring to the drawing in detail, wherein like numerals indicate like elements, there is shown in FIG. 1 an anthropometric apparatus in accordance with the present invention designated generally as 10. The apparatus 10 includes a body support surface in the form of a table having a table section 12 and a table section 14. Section 14 is movable with respect to section 12.

The table section 12 is supported on four legs 16. Open channels 18 and 20 are supported by the undersurface of table section 12 with the openings of the channels facing each other. To facilitate lowering and moving the table section 14 to an inoperative position beneath table section 12, identical structure is provided on opposite sides. Only one side will be described in detail, namely, the side which cooperates with channel 18. A follower 22 rides in channel 18. Follower 22 is pivotably connected to one end of a strut 24.

The other end of strut 24 is fixedly connected to one end of strut 26. The other end of strut 26 has a follower 28 which also rides in the channel 18. Strut 26 has an extension 30 which is pivotably coupled to one end of the table section 14. A pivotable leg 36 is provided at the other end of table section 14.

Struts 32 and 34 are pivotably connected together. The free end of strut 32 is pivotably connected to strut 26. The free end of strut 34 is pivotably connected to the undersurface of table section 14.

As shown more clearly in FIG. 2, the width of table section 14 is less than the distance between the channels 18 and 20. Hence, the table section 14 may be pivoted by first collapsing leg 36, collapsing the struts 32 and 34 and then permitting the section 14 to pivot with respect to extension 30. Thereafter, the entire table section 14 may be pushed to a position beneath the section 12 so as to be disposed in an inoperative position when not in use. The table section 12 may thereafter be used for supporting a patient in a lying down position, as is conventional. If desired, a head and shoulder rest 38 may be provided on the upper surface of table section 12 at the end thereof remote from section 14. It will be appreciated that other conventional devices for facilitating collapsing the leg 36 on section 14 and positioning section 14 beneath the table section 12 may be utilized.

The table section 14 reciprocably supports a pair of force-applying means 40 and 42 for applying a force to a body component such as the leg of a person. The force-applying means are identical. Hence, only means 40 will be described in detail, with corresponding primed numerals being applied to the corresponding structure on means 42.

The force-applying means 40 includes a body engaging member 44 in the form of a flat upright plate. Member 44 is adapted to be in intimate contact with the bottom of the sole of the foot. Member 44 is part of a force indicator 46 having a scale 48 on the opposite face from member 44. Scale 48 includes indicia for indicating the amount of force applied to the leg.

The force indicator 46 is fixedly secured to a flange 50 on a sleeve 52 in any convenient manner such as by welding. The sleeve 52 is internally threaded and meshed with threads on threaded member 54. Threaded member 54 has a cap 56 secured to one end. The cap 56 overlies the closed end of a cup member 58. The open end of the cup member 58 is fixedly secured in any convenient manner to the rear wall 60 of a support means for the body engaging member 44 and force indicator 46. The support means includes forwardly projecting side walls 62 and 66 and a bottom wall 64. Sleeve 52 is slidably received within the cup member 58. The force indicator 46 and body engaging member 44 may be slidably supported on the upper surface of bottom wall 64 or alternatively supported by shoulders 68 on walls 62 and 66, as shown more clearly in FIG. 4.

A key 70 is removably secured to the bottom surface of wall 64. Key 70 rides in a longitudinal slot 72 which is parallel to the walls 62 and 66. Slot 72 is perpendicular to the body engaging member 44.

Ratchets 74 and 76 are provided on opposite sides of the support means adjacent the wall 60. Ratchet 74 is provided with an operating tab 78 and ratchet 76 is provided with an operating tab 80. Ratchet 74 has teeth in meshing engagement with a row of slanted teeth 84. Ratchet 76 has teeth in meshing engagement with a row of slanted teeth 82. The operating tabs on the ratchets facilitate raising of the ratchets so as to be out of engagement with the rows of teeth as will be described hereinafter.

The table section 14 may be provided with an insert 86 preassembled and constructed so as to have therein the slot 72, and provided with the rows of teeth 82 and 84 on its upper surface. This construction facilitates assembly and substantially reduces the cost of the unit. A similar insert 86' is provided for the force-applying means 42.

The force-applying means 40 is provided with a device for facilitating a rigid connection with the insert 86 while at the same time facilitating adjustment of the invention so that persons of different heights may be measured by the present invention. Thus, a bolt 90 extends downwardly from the lower surface of wall 64 through the slot 72. A head 88 is threadedly connected to the bolt 90 to facilitate anchoring the force-applying means in any predetermined position along the length of the slot 72.

The upper surface of the table section 14 is provided with indicia 96 between the inserts 86 and 86'. The force-applying means 40 is provided with a pointer 92 overlying the indicia 96. The force-applying means 42 is provided with a similar pointer 94 overlying the indicia 96. See FIGS. 2 and 4.

The apparatus of the present invention is utilized as follows:

Where it is desired to measure the length of the legs or other body component of a patient, the table section 14 is moved from its inoperative position and orientated as shown in FIG. 1. The patient lies on the table sections 12 and 14. The head and shoulders of the patient may be in contact with the rest 38. Rest 38 provides positive assurance that the patient will not move longitudinally along the table sections when force is applied to the ends of the legs of the patient.

The head 88 on each of the force-applying means 40 and 42 will be loosened so that these devices may be reciprocated along the length of their respective slots 72 and 72' to a position wherein member 44 and the corresponding member will be juxtaposed to the bottom of the feet of the patient and apply pressure thereto. The amounts so as to move member 44, and the corresponding member on means 42, into contact with the bottoms of the feet of the patient and applying pressure thereto. The amounts of pressure applied to the bottoms of the feet of the patient are visible on the scale 48 of each of the means 40 and 42. Pressure will be applied by each of the means 40 and 42 in an amount equal to one-half the weight of the patient, which has previously been ascertained.

When the correct amount of pressure has been applied to the bottoms of the feet of the patient, the distance between the pointers 92 and 94 will be ascertained by observing the indicia 96. If the pointers 92 and 94 are directly opposite one another, the lengths of the legs of the patient are equal. Any difference between the lengths of the legs of the patient will be ascertained by observing the linear distance between the pointers 92 and 94. The accuracy of this measurement depends upon the accuracy of the indicia 96. It is possible to measure this difference in hundredths of an inch.

When moving the force-applying means 40 from the solid-line position in FIG. 1 to the phantom position, means 40 is guided by the key 70 which enters the slot 72. During such movement, the ratchets 74 and 76 require no attention. While force is applied to the bottoms of the feet of the patient, the reactive force tending to cause relative movement between the table section 14 and the force-applying means is absorbed by the teeth on the ratchets cooperating with the rows of teeth 82 and 84. When it is desired to move the force-applying means 40 from the phantom position in FIG. 1 to the solid line position in FIG. 1, it is necessary to apply an upward force on the tabs 78 and 80 as indicated by the arrow in FIG. 5, while reciprocating the force-applying means, having previously loosened the head 88.

I prefer to have a pair of the force-applying means 40 and 42. It would be possible to use only one such means. If only force-applying means 40 is provided, the measurements of the legs will have to be done one at a time and the positions of the pointer recorded for comparison.

The present invention may be embodied in other specific forms without departing from the spirit or essential attributes thereof.

I claim:

1. An anthropometric apparatus comprising means defining a support surface, at least one-force-applying means adapted to engage a portion of a person's leg supported by said surface to apply a compressive force axially of said leg, said force-applying means comprising a leg portion engaging member, support means for said leg portion engaging member, means rigidly coupling said support means to said support surface, means coupled to said support means and said leg portion engaging member for selectively moving said leg portion engaging member in a direction generally parallel to said support surface for applying to the leg portion a force of at least one-half the person's weight, means coupled to said leg portion engaging member for indicating the force applied by it to the leg portion, and a position indicator coupled to said leg portion engaging member for indicating the linear position of said leg portion engaging member relative to indcia on said support surface.

2. Anthropometric apparatus in accordance with claim 1 wherein said means coupling said support means to said support surface comprises releasable means for rigidly coupling said support means to said support surfaces at selected positions thereon.

3. Anthropometric apparatus in accordance with claim 1 wherein said means for selectively moving said leg portion engaging member comprises a rotatable screw-threaded member, said position indicator comprises a pointer coupled to said leg portion engaging member and the indicia on said support surface being juxtaposed to said pointer.

4. Anthropometric apparatus in accordance with claim 1 wherein said means for indicating the force applied to the leg portion comprises a force measuring scale including indicia for indicating the amount of force being applied.

5. Anthropometric apparatus in accordance with claim 1 comprising two force-applying means each adapted to engage a portion of a leg supported by said surface to apply a compressive force axially of said leg; said leg portion engaging members being foot-engaging members disposed on said support surface for independent movement in side-by-side paths, and said engaging members having mutually facing position indicators cooperable with said indicia for indicating the linear positions of said foot-engaging members.

6. Anthropometric apparatus in accordance with claim 5 wherein said surface has a pair of guide slots each receiving a portion of one of said members so that the members may be reciprocated along the slots.

7. Apparatus for measuring the length of a leg of a person comprising a support member, means defining a horizontally disposed elongated support surface, means for rigidly coupling said support member to said surface at selected positions thereon, a foot-engaging members coupled to said support member and movable relative thereto in a direction generally parallel to the longitudinal axis of the support surface, mechanical means coupled to said support member and said foot-engaging member for selectively moving said foot-engaging member to apply force to the bottom of a foot in an amount equal to one-half the person's weight, scale means coupled to said foot-engaging member for indicating the force applied to the foot, indicia on said support surface, and a position indicator coupled to said foot-engaging member and cooperable with said indicia on said support for measuring the position of said foot relative to said indicia.

8. Apparatus in accordance with claim 7 including a releasable ratchet means on said support member, said ratchet means cooperating with teeth on said body support surface to prevent relative movement between said support surface and said support member due to reaction forces applied to the support member by a person's foot.

9. Apparatus in accordance with claim 1 wherein said means defining a support surface is a table having two sections connected together, two leg portion engaging members including a pair of foot-engaging members mounted on one of the sections, said one section being movable so that it may be positioned in an inoperative position wherein the sections are disposed in different planes with said one section below the other, and said foot-engaging members being independently movable along said one section in side-by-side paths.

10. Apparatus for measuring and comparing the lengths of the legs of a person comprising a generally horizontal member defining a body support surface, positioning means on said body support surface for retaining a body in fixed position on said surface, a pair of force-applying means in side-by-side disposition on said body support surface, each of said force-applying means comprising a foot-engaging member, separate means coupled to each foot-engaging member for moving said member in a direction to apply to a person's foot a force approximately one-half the weight of the person, and means coupled to said foot-engaging members for indicating any difference in the positions of the members in the force-applying direction, thereby indicating any difference in the lengths of the legs.

References Cited

UNITED STATES PATENTS 3,196,551    7/1965    Provost et al. _____ 33—174

FOREIGN PATENTS 977,310    12/1964    Great Britain.

DELBERT B. LOWE, Primary Examiner

U.S. Cl. X.R.

33—74